(12) United States Patent
Habetha et al.

(10) Patent No.: US 7,826,420 B2
(45) Date of Patent: Nov. 2, 2010

(54) METHOD OF CONNECTING A NEW DEVICE TO EXISTING NETWORK

(75) Inventors: Joerg Habetha, Aachen (DE); Markus Meng Hai Ang, Singapore (SG)

(73) Assignee: Koninklijke Philips Electronics N.V., Eindhoven (NL)

( * ) Notice: Subject to any disclaimer, the term of this patent is extended or adjusted under 35 U.S.C. 154(b) by 631 days.

(21) Appl. No.: 11/572,276

(22) PCT Filed: Jul. 11, 2005

(86) PCT No.: PCT/IB2005/052282

§ 371 (c)(1),
(2), (4) Date: Jan. 18, 2007

(87) PCT Pub. No.: WO2006/011077

PCT Pub. Date: Feb. 2, 2006

(65) Prior Publication Data

US 2007/0253345 A1    Nov. 1, 2007

(30) Foreign Application Priority Data

Jul. 22, 2004   (EP)   ................................. 04103493

(51) Int. Cl.
*H04W 4/00* (2009.01)
(52) U.S. Cl. ...................... 370/329; 370/278; 370/338; 370/348; 370/277; 455/41.2; 455/507; 455/500
(58) Field of Classification Search ................. 370/310, 370/328, 338, 341, 445, 449, 227, 228, 346, 370/329; 455/41.2, 507, 500
See application file for complete search history.

(56) References Cited

U.S. PATENT DOCUMENTS 6,381,467 B1    4/2002   Hill et al.

(Continued)

FOREIGN PATENT DOCUMENTS

EP    1503549 A2    2/2005

(Continued)

OTHER PUBLICATIONS

Trezentos et al, "Algorithms for Ad-hoc Piconet Topology Initialization", Vehicular Technology Conference, 2003, VTC 2003-Fall, IEEE vol. 5, pp. 3448-3452.*

(Continued)

*Primary Examiner*—Patrick N Edouard
*Assistant Examiner*—Neda Behrooz

(57) ABSTRACT

In a centralized radio network consisting of several devices one device acts as master or network coordinator and has a transmission range. Basically, other devices of the network are able to adopt the role of a coordinator. This ability is used to enlarge the area of the network to a size larger than the transmission range of the master. A device asks its parent PNC to become a child PNC when a newly turned on device acts as a temporary PNC and broadcasts an initiation beacon indicating that it looks for a child PNC. The child PNC reports that it is available. The new device determines one of the available child PNCs to be its new master. The acknowledgment for the selected child PNC may be broadcasted to inform all the devices in the transmission range of the new device. The new device quits the role of the temporary PNC and associates to the existing network.

12 Claims, 5 Drawing Sheets

U.S. PATENT DOCUMENTS

| | | | |
|---|---|---|---|
| 6,925,064 B2 * | 8/2005 | Hester et al. | 370/255 |
| 2001/0029166 A1 | 10/2001 | Rune et al. | |
| 2003/0099212 A1 * | 5/2003 | Anjum et al. | 370/328 |
| 2005/0195757 A1 * | 9/2005 | Kidder et al. | 370/278 |

FOREIGN PATENT DOCUMENTS

| | | |
|---|---|---|
| EP | 1517490 A2 | 3/2005 |
| WO | WO2005062809 A2 | 7/2005 |

OTHER PUBLICATIONS

Tan, G.: "Interconnecting Bluetooth-like Personal Area Networks"; 1st Annual Oxygen Workshop, Gloucester, MA, 2001.

Tuduce et al: "Organizing a Distributed Application in a Mobile Ad Hoc Network"; Proceedings of 2nd IEEE International Symposium on Network Computing and Applications, Apr. 2003, pp. 231-238.

Kumar, N.: "805.15.3 MAC Layer Overview and Proposed Enhancement Fo Support UWB PHY"; Mobile and Portable Radio Research Group, Virginia Tech.

Trezentos et al: "Algorithms for Ad-Hoc PICONET Topology Initialization"; Vehicular Technology Conference, 2003, VTC 2003-Fall, IEEE vol. 5, Oct. 6, 2003, pp. 3448-3452, XP010701576.

* cited by examiner

METHOD OF CONNECTING A NEW DEVICE TO EXISTING NETWORK

The invention relates to a method of connecting a new device to an existing network. The network or piconet comprises a coordinator which controls a certain part, e.g. a cell or a cluster, of the network. Such networks are often referred to as cluster-based or piconet-based networks. For example, the Bluetooth standard is used for piconet-based networks. The central controllers of the clusters are therefore called Cluster Heads or PicoNet Coordinators (PNCs). The inventive method is based on a procedure of how a device that is out of the transmission range of an existing PNC can be informed about the existing PNC and how the device then can be connected to the existing piconet thereby avoiding interference between neighbouring, uncoordinated piconets.

The invention especially relates to wireless personal area networks (WPAN) according to the protocol IEEE P802.15.3. This protocol is based on a centralised and connection-oriented ad-hoc networking topology. At initialisation of a new network, one device or node will be required to assume the role of the coordinator of the WPAN, i.e. it will become the piconet coordinator/scheduler (PNC). The PNC may provide the basic network synchronisation timing,
perform admission control,
allocate network resources on the piconet according to a pre-defined set of quality of service (QoS) polices,
allocate the amount of channel time (CT) resources available for data transfer and
manage Power Safe requests.

A device that is trying to access the medium tries to detect a coordinator to associate to. If it does not detect a coordinator within a determined period of time it becomes itself a piconet coordinator. A device participating in one piconet sometimes looks for other piconets with a better signal or a lower network load. Every device of a piconet can hear the PNC and the slot assignments.

Overlapping cells that share the same channel frequency can build a child/neighbour piconet that timeshares a channel between two PNCs (parent and child/neighbour) sitting on the same frequency and being within range.

The IEEE802.15.3 protocol may be used for a peer-to-peer communication in a Wireless Personal Area Network (WPAN). The current medium access control (MAC) specification is based on a centralised approach. Access to the wireless medium is granted by a central device called the piconet coordinator (PNC). The PNC and all devices under its control form a piconet. It is possible that several piconets are formed in case not all devices are located in mutual transmission and reception range. One topology defined in IEEE 802.15.3 for multiple piconet scenarios consists of a hierarchy of PNCs. Per definition one PNC is the highest PNC in the hierarchy. This PNC can have one or several child-PNCs (CPNCs) which themselves can have several child-PNCs and so on. When a device is turned on, it begins to scan all the available channels for an existing PNC. While scanning, information about the channels in use is also collected and stored. The devices use passive scanning, that is listening for beacon frames from PNC. This can be a good indication of whether or not there is a piconet in the vicinity. If during the scanning process a broadcast signal like a beacon has not been detected, the device assumes that there is not any PNC in its vicinity to which it could associate. The device will then adopt the role of a PNC by internally issuing a PNC start primitive.

Nishant Kumar, "802.15.3 MAC layer Overview and Proposed Enhancements to Support UWB PHY", Mobile and Portable Radio Research Group, Virginia Tech. discloses the feature child piconet. An alternate coordinator requests GTS (guaranteed time slots) using channel request time command. After receiving a GTS slot the child PNC starts sending beacon in the private GTS. A child piconet uses a distinct piconet ID (identification). The child piconet depends on the parent piconet only for the allocation of a GTS. Association, authentication, security and acknowledgements are handled within the child piconet and do not involve the parent PNC. A child PNC device can communicate with any member in the parent piconet or the child piconet. Whereas a neighbour piconet is autonomous and relies on the parent piconet only for the GTS. It uses a distinct piconet ID. Association, authentication, security and acknowledgements are handled within a neighbour piconet and do not involve the parent PNC. A neighbour PNC device can only send channel time requests to parent PNC and listen to its beacon.

A super frame consists of three subsections like beacon, CAP (contention access period), CFP (Contention Free Period). The beacon transmits control information, allocated GTS per stream index for the current super frame and provides network wide timing information. The CAP uses CSMA/CA (Carrier Sense Medium Access with Collision Avoidance) with back-off procedure. It is used for seamless data transfer, channel time requests, authentication, association request, response and other commands in the system. The CRP (contention free period) comprises optional management time slots (MTS) and guaranteed time slots (GTS) that are used for asynchronous or isochronous data streams. The PNC controls in the CAP beacon the type of data to be sent during the CAP.

U.S. Pat. No. 6,381,467 B1 discloses an ad-hoc wireless network having a plurality of members with a master that while communicating on a first communication channel recognises a need for assistance in managing the network. In response to the need, the master negotiates with a member of the ad-hoc wireless network for the member to become a sub-master. The sub-master then assumes management of a portion of the plurality of members. The sub-master and the portion then communicate on a second communication channel negotiated with the master. The processor is programmed to recognise the need for assistance in response to detecting a need to establish communications between a first communication device in the ad-hoc wireless network and a second communication device within range of the first communication device but not within range of the master. In this case, the master can negotiate this first communication device for the first communication device to become a sub-master and then to establish its own ad-hoc wireless network with the second communication device on a communication channel different from the communication channel used by the master.

Godfrey Tan, "Interconnecting Bluetooth-like Personal Area Networks", in 1st Annual Oxygen Workshop, Gloucester, Mass., 2001, discloses an algorithm for a personal area network that contracts a tree incrementally, one node at a time. When a node wishes to join the network, it sends out frequent search announcements. Nodes that already belong to the scatternet of multiple piconets periodically listen on a pre-defined channel for these announcements and respond if they are willing to accept a new neighbour. When there is more than one node responding to the new node, a decision has to be made on which present node a new device should join. This decision can be made by the new node based on the responses it hears or by the root. The root can gather the information from all the child nodes which hear the search messages and choose which one to respond to the searching node. When a new node connects to a node in the scatternet, the latter becomes a "parent" and the former its "child".

One object of the invention is to provide a method of connecting to an existing centralized radio network (piconet) which comprises a master device such as a network coordinator and at least one further device in the transmission range of the network coordinator (PNC) a further device not being in the transmission range of the network coordinator. A further object is to provide a network to which a new device that is out of the transmission range of the network coordinator may associate to.

The object is solved by a method of connecting to an existing centralized radio network (piconet) which comprises
a master device such as a network coordinator and
at least one further device in the transmission range of the network coordinator a at least one new device not being in the transmission range of the network coordinator, with the method comprising the steps of
the new device becoming a temporary network coordinator which broadcasts a beacon with an initiation request (such as a PNC request IE) indicating that it intends to associate to an existing network (piconet);
those devices that became a child network coordinator signalling a response to the initiation beacon in form of one or several broadcast or unicast frames indicating that they are available child piconet coordinators;
the new device that acts as a temporary network coordinator scanning the channels or frequencies, receiving the response signals and choosing at least one of the available child network coordinators as master;
acknowledging at least the selected child network coordinators' response signals and
finishing the role of a temporary network coordinator and becoming a slave with regard to the chosen child network coordinator which works as a coordinator.

When the new device becomes a temporary PNC it is able to broadcast signals such as beacons that are read by any device in the transmission range. Devices which are receiving the initiation beacon are informed of the new device's intention to associate to a network and at the same time of the fact that it would not make sense to do a handover even if the signal level is higher than the one of its own PNC as the new device will not stay a PNC.

The step of becoming a child network coordinator is alternatively performed by a device that has received the beacon with the initiation request
asking its network coordinator (master) whether to become a child network coordinator of the parent network coordinator in order to become a master for the new device or
making itself a child network coordinator without asking the parent network coordinator.

The initiation beacon may comprise an information element indicating a temporary network/piconet identification. This temporary identification indicates that other devices neither should associate to the temporary PNC nor do a handover.

The temporary network coordinator may wait for a response a certain period of time corresponding to a given number of beacon frames. During that time the exchange between the network's coordinator and the probable child PNC should be carried out. When that certain period of time is over and scanning the channels/frequencies did not result in discovering a child PNC, the new device itself becomes a new PNC and starts an own piconet as there is not a piconet in the vicinity to associate to.

According to one embodiment the acknowledgement of a selected child network coordinator is transmitted as part of a beacon signal such that other child PNCs which were available can be returned to their former state immediately.

The object is also solved by a centralized radio network (piconet) consisting of at least two devices wherein one of the at least two devices is a network coordinator having a transmission range for its beacons and wherein at least one further device is in the transmission range of the network coordinator and wherein a new device scans the channels or frequencies for discovering a network coordinator's beacon of an existing network in order to associate to it, wherein
the new device becomes a temporary network coordinator if it did not receive a beacon signalled by a network coordinator within a certain time and sends out an initiation beacon indicating that it intends to associate to an existing network (piconet);
a device belonging to an existing network (piconet) that receives the initiation beacon signal of the temporary network coordinator asks its own network coordinator whether to become a child network coordinator and in case of positive answer: transmitting a corresponding response signal indicating that it is an available child piconet coordinator to associate to;
the temporary network coordinator receives the response signals, compares them and determines at least one of the available devices which will become the child network coordinator (CPNC) it associates itself to;
the temporary network coordinator (tempPNC) acknowledges the availability signals of the selected CPNC(s) and changes its state into being a slave with regard to the selected child network coordinator(s) (CPNC(s)) and
the new device thus is connected to the existing network (piconet).

A computer program that is run down by a processor and comprises instructions for the implementation of a method of connecting to an existing network a new device.

A device of consumer electronics comprising a processor for running down a computer program that comprises instructions for the implementation of a method of connecting to an existing network a new device that is out of the transmission range of the network coordinator and comprising means for the implementation of such a method.

The invention may be summarized by a centralised radio network consisting of several devices wherein one device acts as master or network coordinator and has a transmission range. Basically, other devices of the network are able to adopt the role of a coordinator. This ability is used to enlarge the area of the network to a size larger than the transmission range of the master. A device asks its parent PNC to become a child PNC when a newly turned on device acts as a temporary PNC and broadcasts an initiation beacon indicating that it looks for a child PNC. The child PNC reports that it is available. The new device determines one of the available child PNCs to be its new master. The acknowledgment for the selected child PNC may be broadcasted to inform all the devices in the transmission range of the new device. The new device quits the role of the temporary PNC and associates to the existing network.

In the following, the invention will be described in further detail with reference to the accompanying drawing, wherein FIG. 1 illustrates a situation according to the prior art with a device outside the beacon transmission (Tx) range of a PNC-1 of a first piconet;

Figure 1:
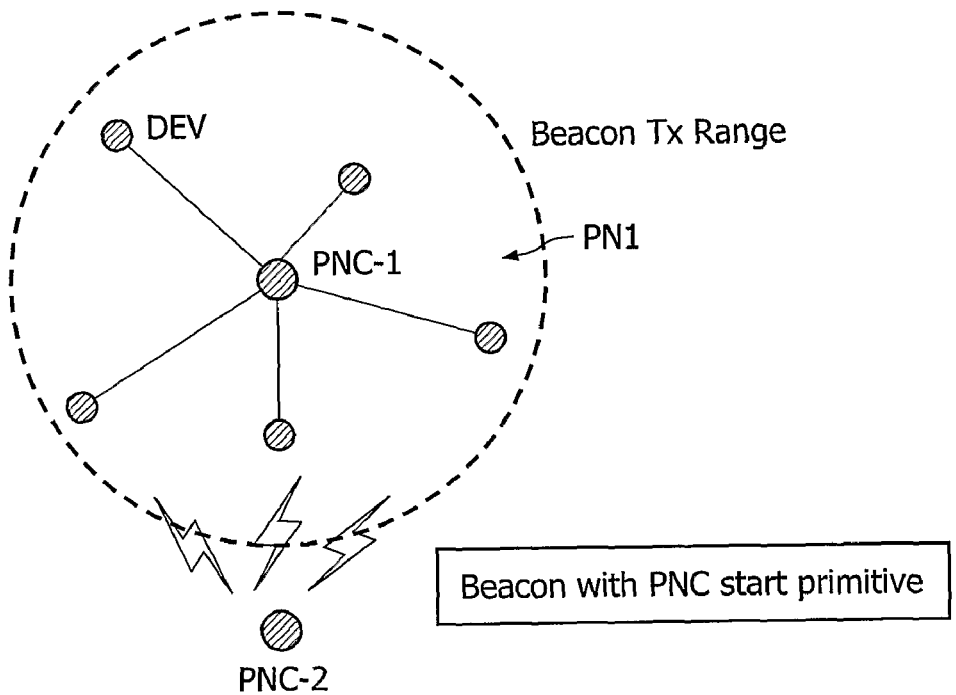

FIG. 1 illustrates a situation according to the prior art with a device outside the beacon transmission (Tx) range of a PNC-1 of a first piconet and thus not being able to associate to the first piconet. Thus, the new device itself has to become a PNC-2 and starts a second piconet. Two piconets close to one another may result in interference. For example, a device in the intersection of the transmission ranges of both PNCs may switch over to the other piconet if the beacon signal of that PNC is of higher strength. One solution to cope with the interference would be to open the second piconet on a different channel. However, there are systems like 802.15.3a, in which the channels are not fully orthogonal resulting in interference among the two piconets, even if they operate on two different channels.

Figure 2:
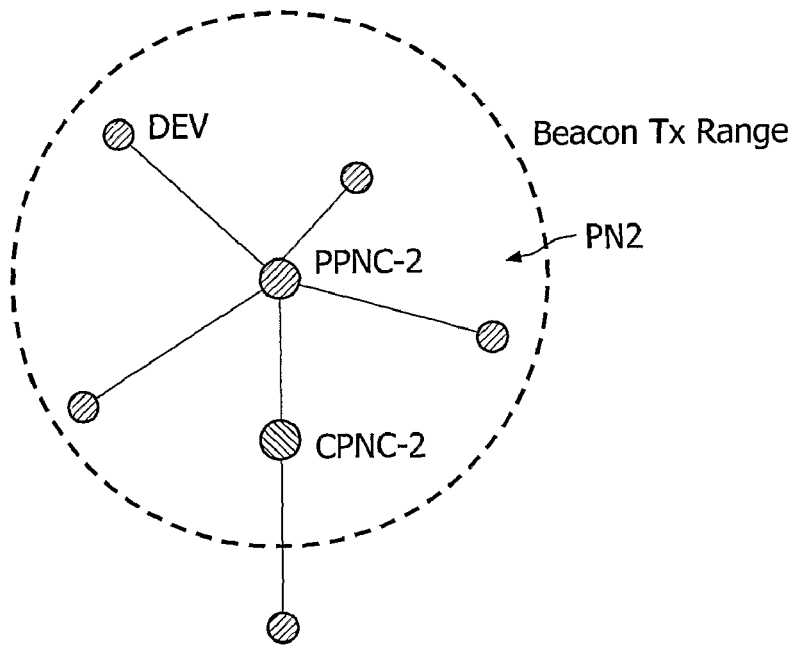
FIG. 2 illustrates one alternative of the invention with a topology resulting in a single piconet where a new device is located outside the beacon Tx range of the Parent PNC.

FIG. 2 illustrates one alternative of the invention with a topology resulting in a single piconet where a new device DEVnew, i.e. a device that has just been turned on, is located outside the beacon Tx range of the Parent PNC (PPNC), but within the hearing range of the Child PNC (CPNC). The new device associates itself to the CPNC which becomes its master. By setting up a CPNC which becomes a master for a new device it is avoided that the new device outside the Tx range of a PNC itself becomes a PNC and starts a piconet on its own.

Figure 3:
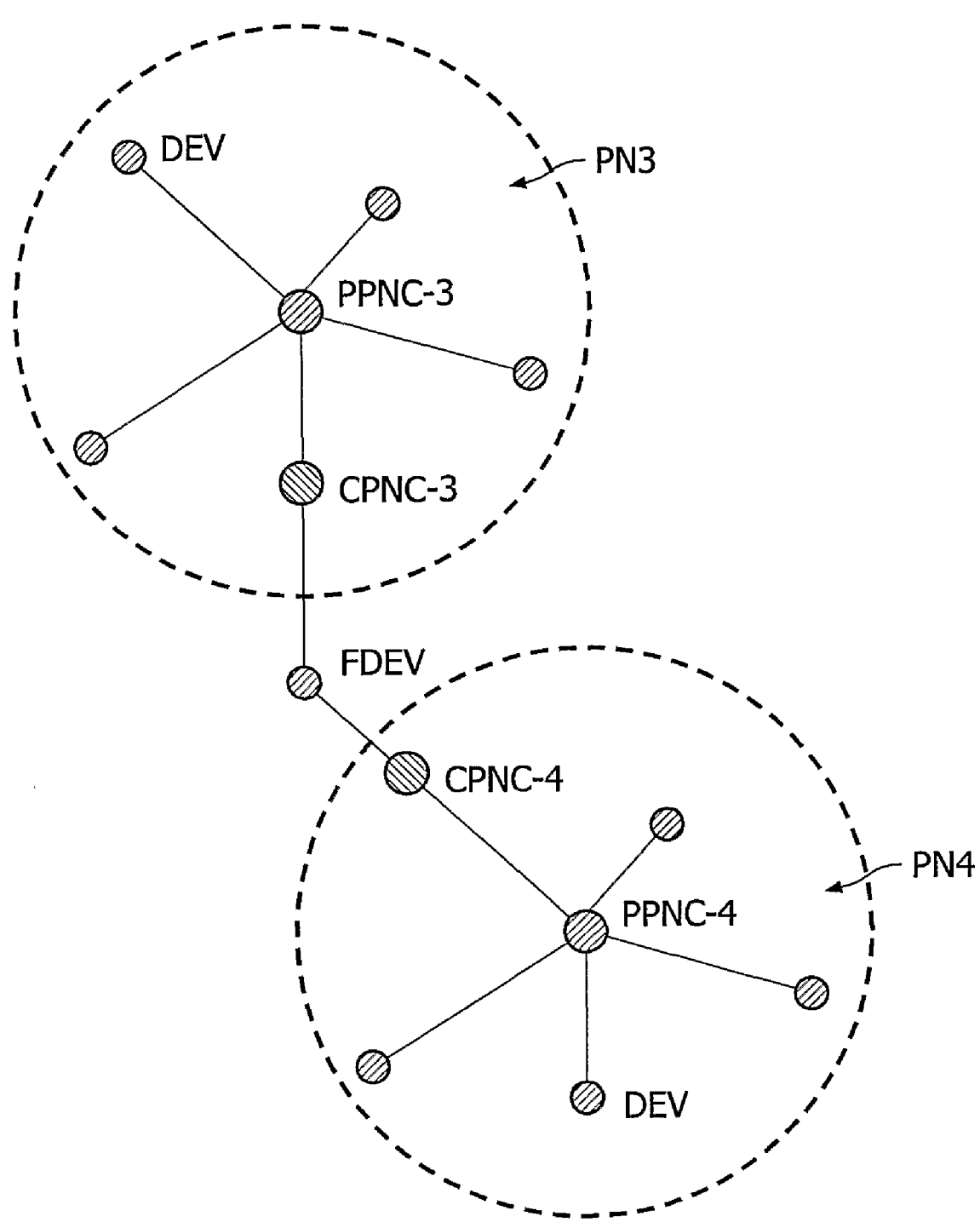
FIG. 3 illustrates another alternative of the invention with a topology where a device that has been turned on intends to associate a piconet and becomes a forwarding device.

FIG. 3 illustrates another alternative of the invention with a topology where a device that has been turned on intends to associate to a piconet and becomes a forwarding device FDEV with two masters: the first master is a CPNC-1 of a first piconet and the second master is a CPNC-2 of a second piconet. In this example the former topology before the association of the new device is kept and the new device becomes a FDEV. By this process two completely isolated piconets are connected while keeping the current topology.

Figure 4:
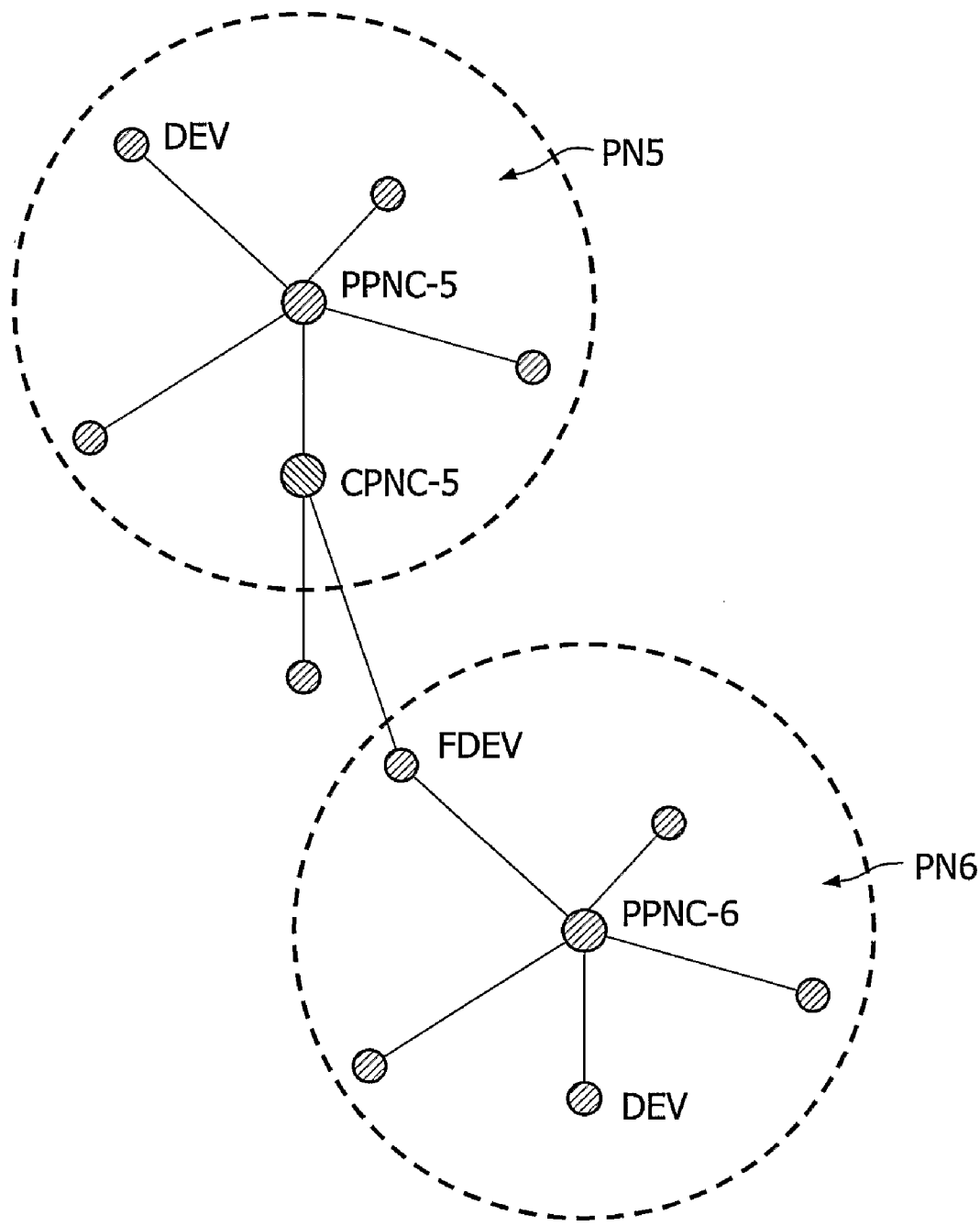
FIG. 4 illustrates a further alternative of the invention where a change in the topology occurs resulting in two piconets with two PPNCs and with only one CPNC and FIG. 5 illustrates a situation where several CPNCs are available.

FIG. 4 illustrates a further alternative of the invention. The arrangement of the devices is the same as the one of FIG. 3. But, according to the alternative a change in the topology occurs resulting in two piconets PN-5 and PN-6 with two PPNCs (PPNC-5 and PPNC-6) and with only one CPNC-5 compared to FIG. 3 where the two piconets PN-3 and PN-4 comprise two PPNCs (PPNC-3 and PPNC-4) and two CPNCs (CPNC-3 and CPNC-4). The topology is changed after the association of the new device to the two piconets. In this example, when the new device associates to the first piconet one device of the first piconet becomes a CPNC-5 for the new device as well as for the former CPN-6 (s. FIG. 3) of the second piconet PN-6, the former CPN-6 becomes a FDEV associated to two masters, namely CPNC-5 and CPNC-6. By means of the newly formed CPNC-5 the two formerly completely isolated piconets are connected with a change of the topology.

Figure 5:
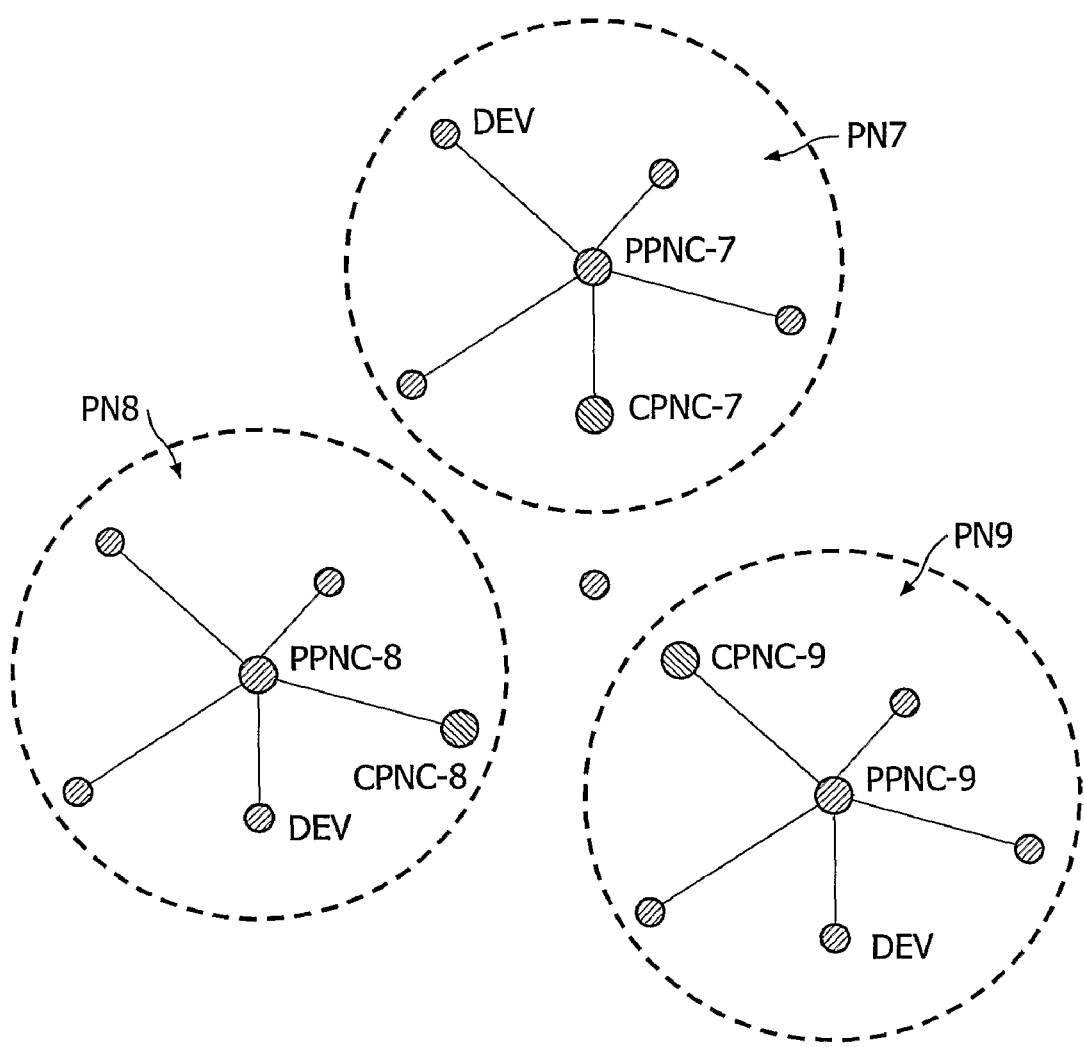

FIG. 5 illustrates a situation where several CPNCs are available. In this example three piconets PN-7, PN-8, PN-9 exist, each of them with a certain transmission Tx range around the PPNC-7, PPNC-8, PPNC-9. A further device is turned on outside the transmission range of each of the PPNCs. The new device is located in such a way that in its transmission range one device of each of the three piconets PN-7, PN-8, PN-9 exists. This means that three devices may be available as CPNC if their PPNC allows it. In this case, the new device which acts as a temporary PPNC when turned on, determines at least one of the available CPNCs as its master. In most cases the new device will select exactly one CPNC; however it might also be possible that the device wants to connect to several piconets or to act as a forwarding device FDEV between the piconets, in which case it would select several CPNCs. These devices will then be acknowledged as CPNC(s). After having determined at least one of the available CPNCs as master the new device which temporarily acted as a PPNC returns to the behaviour of a slave. The other available CPNCs which where not selected return to the state in which they previously were.

Figure 6:
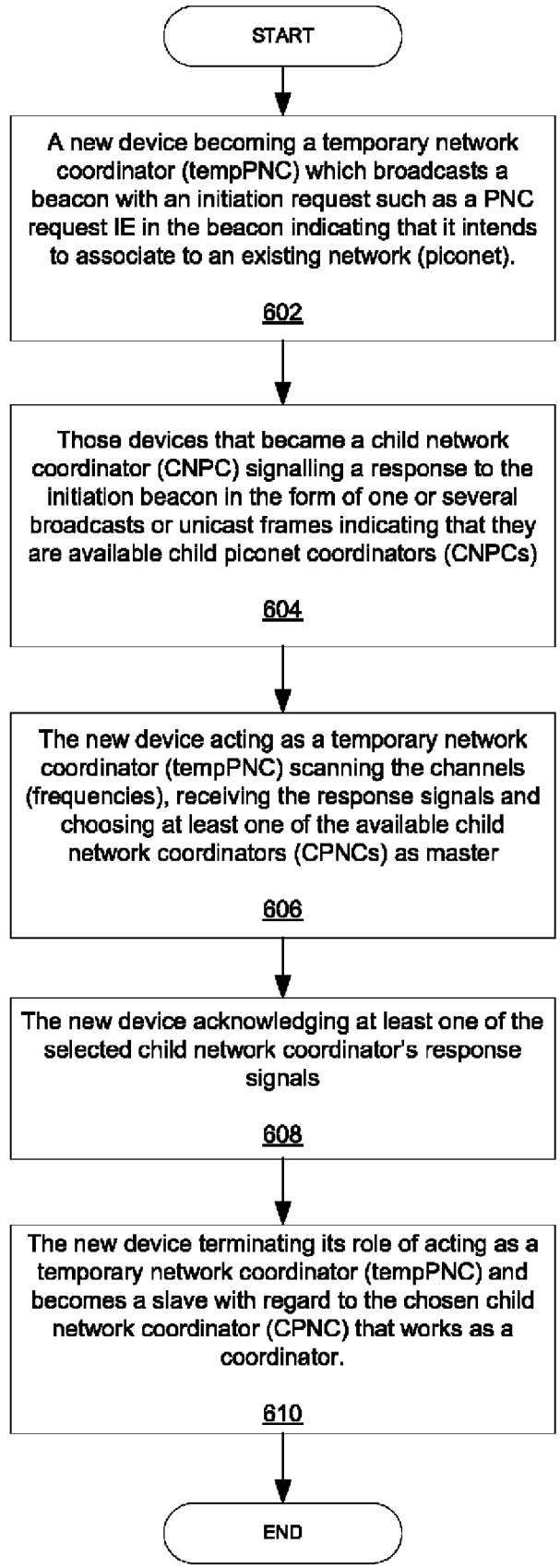
FIG. 6 is a flowchart illustrating steps of a method for connecting a device to an existing centralized radio network (piconet).

FIG. 6 is a flowchart illustrating steps of a method for connecting a device to an existing centralized radio network (piconet).

At step 602, a new device to be added to the network becomes a temporary network coordinator (tempPNC) which broadcasts a beacon with an initiation request such as a PNC request IE in the beacon indicating that it intends to associate to an existing network (piconet).

At step 604, those devices that became a child network coordinator (CNPC) signalling a response to the initiation beacon in the form of one or several broadcasts or unicast frames indicating that they are available child piconet coordinators (CNPCs)

At step 606, the new device to be added to the network acts as a temporary network coordinator (tempPNC) scanning the channels (frequencies), receiving the response signals and choosing at least one of the available child network coordinators (CPNCs) as master At step 608, the new device to be added to the network acknowledges at least one of the selected child network coordinator's response signals.

At step 610, the new device to be added to the network terminates its role of acting as a temporary network coordinator (tempPNC) and becomes a slave with regard to the chosen child network coordinator (CPNC) that works as a coordinator.

The invention claimed is:

1. A method of connecting a new device to be added to an existing centralized radio network (piconet) the network comprising a master device and at least one further device in the transmission range (Tx) of the network coordinator (PNC) at least one new device not being in the transmission range (Tx) of the network coordinator (PNC), the method comprising the steps of:

a) the new device to be added to the network, not being in the transmission range (Tx) of the network coordinator (PNC), becoming a temporary network coordinator (tempPNC) which broadcasts a beacon with an initiation request in the beacon indicating that it intends to associate to an existing network (piconet);

b) a device belonging to an existing network (piconet) that receives the beacon with the initiation request of the temporary network coordinator (tempPNC) optionally asks its own network coordinator (PNC) whether to become a child network coordinator (CPNC) and in case of positive answer or in case the optional request at the own PNC is not needed: transmitting a corresponding response signal indicating that it is an available child piconet coordinator (CPNC) to associate to;

c) those devices that became a child network coordinator (CPNC) signalling a response to the initiation beacon in form of one or several broadcast or unicast frames indicating that they are available child piconet coordinators (CPNCs);

d) the new device to be added to the network acting as a temporary network coordinator (tempPNC) scanning the channels or frequencies, receiving the response signals and choosing at least one of the available child network coordinators (CPNCs) as master;

e) the new device to be added to the network acknowledging at least one of the selected child network coordinators' response signals and f) the new device to be added to the network terminating its role of acting as a temporary network coordinator (tempPNC) and becoming a slave with regard to the chosen child network coordinator (CPNC) that works as a coordinator.

2. A method as claimed in claim 1, wherein the step of becoming a child network coordinator (CPNC) is alternatively performed by a device that has received the beacon with the initiation request, the device receiving the beacon with the initiation request:

a) the new device to be added asking its network coordinator (master) whether to become a child network coordinator (CPNC) of the parent network coordinator (PPNC) in order to become a master for the new device and the PPNC giving a response to this request or otherwise, b) the new device to be added making itself a child network coordinator (CPNC) without asking the parent network coordinator (PPNC).

3. A method as claimed in claim 1, wherein the initiation beacon comprises an information element indicating a temporary network/piconet identification (tempPNID).

4. A method as claimed in claim 1, wherein the temporary network coordinator (tempPNC) waits for a response a certain period of time corresponding to a given number of beacon frames.

5. A method as claimed in claim 1, wherein the acknowledgement of a selected child network coordinator (CPNC) is transmitted as part of a beacon signal.

6. A centralized radio network (piconet) consisting of at least two devices wherein one of the at least two devices is a network coordinator (PNC) having a transmission range (Tx) for its beacons and wherein at least one further device is in the transmission range (Tx) of the network coordinator (PNC) and wherein:

a new device desiring to connect to an existing centralized radio network scans channels or frequencies for discovering a network coordinator's beacon of an existing network in order to associate to it, wherein the new device becomes a temporary network coordinator (tempPNC) if it did not receive a beacon signalled by a network coordinator's (PNC) beacon within a certain time and sends out an initiation beacon indicating that it intends to associate to an existing network (piconet);

a device belonging to an existing network (piconet) that receives the initiation beacon signal of the temporary network coordinator (tempPNC) optionally asks its own network coordinator (PNC) whether to become a child network coordinator (CPNC) and in case of positive answer or in case the optional request at the own PNC is not needed: transmitting a corresponding response signal indicating that it is an available child piconet coordinator (CPNC) to associate to;

the temporary network coordinator (tempPNC) receives the response signals, compares them and determines at least one of the available devices which will become the child network coordinator (CPNC) it associates itself to;

the temporary network coordinator (tempPNC) acknowledges at least one of the availability signals and changes its state into being a slave with regard to the selected child network coordinator(s) (CPNCs) and the new device thus is connected to the existing network (piconet).

7. A method according to claim 1, wherein the master device is a network coordinator (PNC).

8. A method according to claim 1, wherein the initiation request included in the broadcast beacon is a PNC request.

9. A device to be connected to an existing centralized radio network (piconet), the network comprising a master device, at least one further device in the transmission range (Tx) of the network coordinator (PNC) and said device to be connected to the existing centralized radio network (piconet), wherein said device to be connected is not in the transmission range (Tx) of the master device, the device to be connected to the existing network including at least a processor configured for:

a) enabling the device to become a temporary network coordinator (tempPNC) by broadcasting a beacon with an initiation request, indicating that the device to be connected intends to associate to an existing network (piconet);

b) enabling the device to scan channels (frequencies) as temporary network coordinator (tempPNC) to receive response signals to the initiation beacon from those devices that became a child network coordinator (CNPC), the response signals indicating that the devices that became child network coordinators (CNPCs) are available as child piconet coordinators (CPNCs);

c) enabling the device to choose at least one of the available child network coordinators (CPNCs) as master by acknowledging a corresponding response signal of the at least one of the available child network coordinator (CPNC); and d) enabling the device to cease acting in the capacity of temporary network coordinator (tempPNC) and instead become a slave to the chosen child network coordinator (CPNC).

10. A device according to claim 9, wherein the response signals received from those devices that became a child network coordinator (CNPC) at said scanning step are in the form of one or several broadcasts or unicast frames indicating that the responding at least one further device is available as a child piconet coordinator (CPNC).

11. A device according to claim 9, wherein the master device is a network coordinator (PNC).

12. A device according to claim 9, wherein the initiation request included in the broadcast beacon is a PNC request.

* * * * *